US012579794B2

(12) United States Patent
Liu et al.

(10) Patent No.: US 12,579,794 B2
(45) Date of Patent: Mar. 17, 2026

(54) IMAGE PROCESSING METHOD AND APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Guangdong (CN)

(72) Inventors: Luyan Liu, Shenzhen (CN); Kai Ma, Shenzhen (CN); Yefeng Zheng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 623 days.

(21) Appl. No.: 18/071,106

(22) Filed: Nov. 29, 2022

(65) Prior Publication Data

US 2023/0097391 A1      Mar. 30, 2023

Related U.S. Application Data

(63) Continuation of application No. PCT/CN2022/079496, filed on Mar. 7, 2022.

(30) Foreign Application Priority Data

Mar. 17, 2021    (CN) ......................... 202110286366.X

(51) Int. Cl.
*G06V 10/776* (2022.01)
*G06V 10/762* (2022.01)
(Continued)

(52) U.S. Cl.
CPC .......... *G06V 10/776* (2022.01); *G06V 10/762* (2022.01); *G06V 10/764* (2022.01);
(Continued)

(58) Field of Classification Search
CPC .. G06V 10/776; G06V 10/762; G06V 10/764; G06V 20/70; G06V 10/40;
(Continued)

(56) References Cited

U.S. PATENT DOCUMENTS

2020/0042832 A1   2/2020  Zeng et al.
2021/0241037 A1*  8/2021  Lisowska ............. G06V 10/764
(Continued)

FOREIGN PATENT DOCUMENTS

CN      108764281  A    11/2018
CN      111222648  A     6/2020
(Continued)

OTHER PUBLICATIONS

International Search Report and Written Opinion for priority application No. PCT/CN2022/079496 dated May 17, 2022, in Chinese language, with English language translation of the International Search Report, 11p.

*Primary Examiner* — Han Hoang
(74) *Attorney, Agent, or Firm* — Crowell & Moring LLP

(57) ABSTRACT

An image processing method can reduce costs related to manual labeling, improve training efficiency, and increase a quantity of training samples, thereby improving the accuracy of an image classification model. First images and second images are processed using an image classification model to obtain predicted classification results. The first images include a classification label and the second images include a pseudo classification label. A first loss value indicating accuracy is acquired based on the predicted classification results, the corresponding classification labels, and the corresponding pseudo classification labels. A second loss value indicating accuracy is acquired based on the predicted classification results and the corresponding pseudo classification labels. A model parameter of the image classification model is updated based on the first loss value and (Continued)

the second loss value. Classification processing and acquisition is performed until a target image classification model is obtained.

20 Claims, 7 Drawing Sheets

(51) Int. Cl.
    *G06V 10/764*        (2022.01)
    *G06V 20/70*         (2022.01)
    *G06V 10/40*         (2022.01)

(52) U.S. Cl.
    CPC .............. *G06V 20/70* (2022.01); *G06V 10/40*
                (2022.01); *G06V 2201/03* (2022.01)

(58) Field of Classification Search
    CPC .. G06V 2201/03; G06V 10/82; G06T 7/0012;
                G06T 7/11; G06T 2207/20081; G06T
                2207/30004; G06F 18/214; G06F 18/23;
                      G06F 18/24; G06N 20/00
    See application file for complete search history.

(56) References Cited

U.S. PATENT DOCUMENTS

| | | | | |
|---|---|---|---|---|
| 2022/0101112 A1* | 3/2022 | Brown | .................... | G10L 15/18 |
| 2022/0129705 A1* | 4/2022 | Kim | ..................... | G06V 10/454 |
| 2022/0245941 A1* | 8/2022 | Zhu | ........................ | G06V 20/52 |
| 2022/0253997 A1* | 8/2022 | Tsai | .................... | G06V 10/763 |

FOREIGN PATENT DOCUMENTS

| | | |
|---|---|---|
| CN | 111709315 A | 9/2020 |
| CN | 112131961 A | 12/2020 |
| CN | 112215212 A | 1/2021 |
| CN | 112329659 A | 2/2021 |
| CN | 113724189 A | 11/2021 |
| WO | WO 2022/193973 A1 | 9/2022 |

* cited by examiner

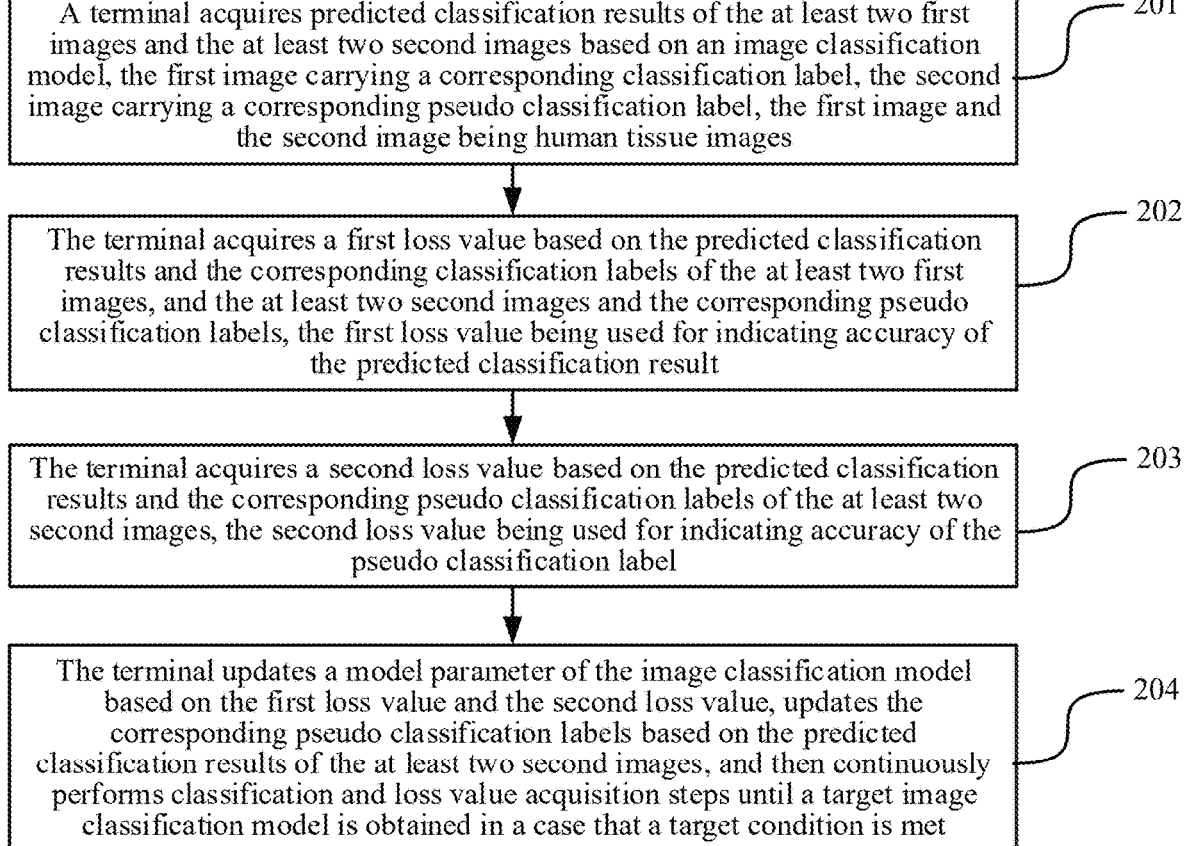

A terminal acquires predicted classification results of the at least two first images and the at least two second images based on an image classification model, the first image carrying a corresponding classification label, the second image carrying a corresponding pseudo classification label, the first image and the second image being human tissue images — 201

The terminal acquires a first loss value based on the predicted classification results and the corresponding classification labels of the at least two first images, and the at least two second images and the corresponding pseudo classification labels, the first loss value being used for indicating accuracy of the predicted classification result — 202

The terminal acquires a second loss value based on the predicted classification results and the corresponding pseudo classification labels of the at least two second images, the second loss value being used for indicating accuracy of the pseudo classification label — 203

The terminal updates a model parameter of the image classification model based on the first loss value and the second loss value, updates the corresponding pseudo classification labels based on the predicted classification results of the at least two second images, and then continuously performs classification and loss value acquisition steps until a target image classification model is obtained in a case that a target condition is met — 204

FIG. 2

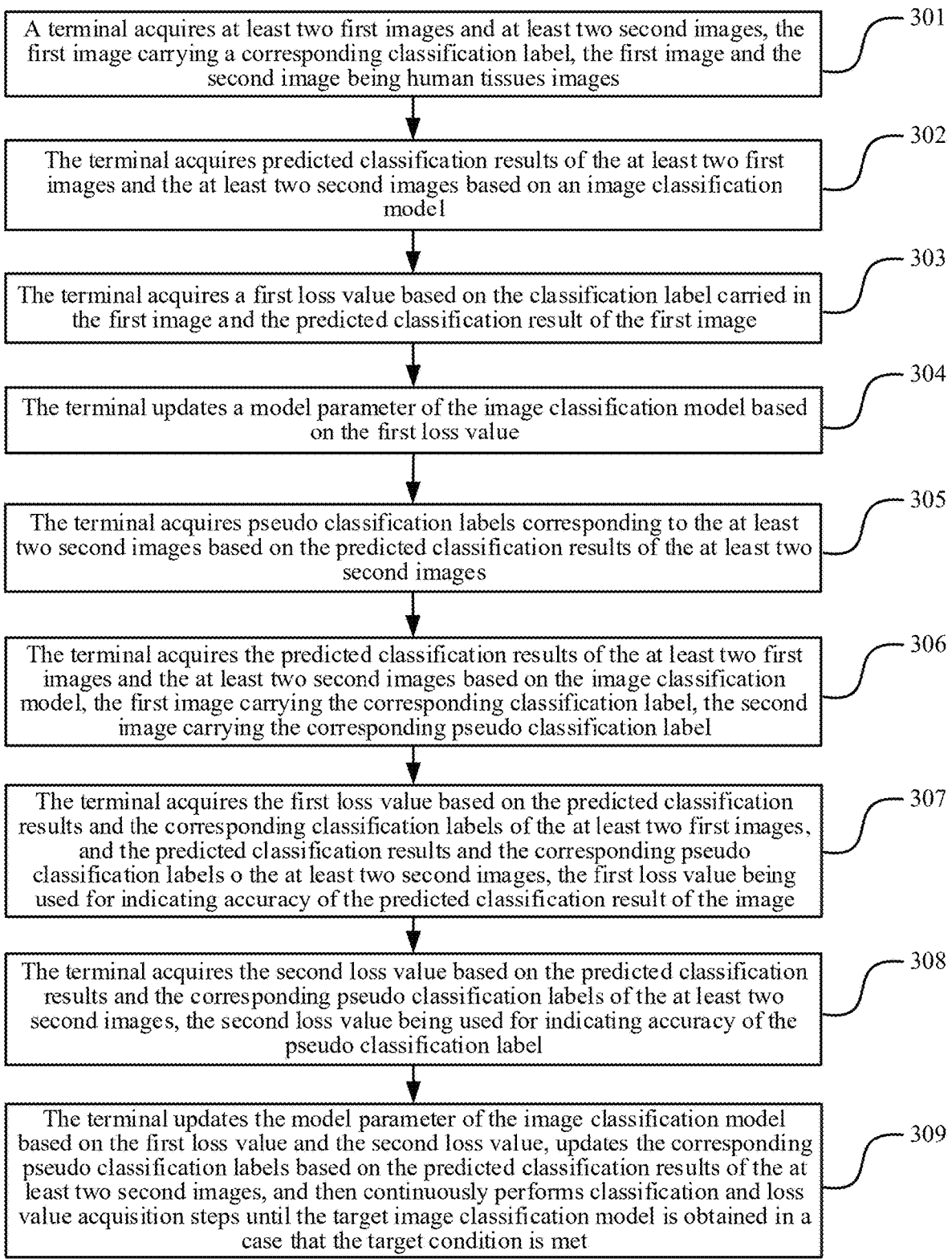

A terminal acquires at least two first images and at least two second images, the first image carrying a corresponding classification label, the first image and the second image being human tissues images — 301

The terminal acquires predicted classification results of the at least two first images and the at least two second images based on an image classification model — 302

The terminal acquires a first loss value based on the classification label carried in the first image and the predicted classification result of the first image — 303

The terminal updates a model parameter of the image classification model based on the first loss value — 304

The terminal acquires pseudo classification labels corresponding to the at least two second images based on the predicted classification results of the at least two second images — 305

The terminal acquires the predicted classification results of the at least two first images and the at least two second images based on the image classification model, the first image carrying the corresponding classification label, the second image carrying the corresponding pseudo classification label — 306

The terminal acquires the first loss value based on the predicted classification results and the corresponding classification labels of the at least two first images, and the predicted classification results and the corresponding pseudo classification labels o the at least two second images, the first loss value being used for indicating accuracy of the predicted classification result of the image — 307

The terminal acquires the second loss value based on the predicted classification results and the corresponding pseudo classification labels of the at least two second images, the second loss value being used for indicating accuracy of the pseudo classification label — 308

The terminal updates the model parameter of the image classification model based on the first loss value and the second loss value, updates the corresponding pseudo classification labels based on the predicted classification results of the at least two second images, and then continuously performs classification and loss value acquisition steps until the target image classification model is obtained in a case that the target condition is met — 309

FIG. 3

IMAGE PROCESSING METHOD AND APPARATUS, ELECTRONIC DEVICE, COMPUTER-READABLE STORAGE MEDIUM, AND COMPUTER PROGRAM PRODUCT

RELATED APPLICATION

This application claims priority as a continuation to PCT/CN2022/079496, filed on Mar. 7, 2022, published as WO2022193973A1, and entitled "IMAGE PROCESSING METHOD AND APPARATUS, ELECTRONIC DEVICE, COMPUTER READABLE STORAGE MEDIUM, AND COMPUTER PROGRAM PRODUCT," which claims priority to Chinese Patent Application No. 202110286366.X filed on Mar. 17, 2021 and entitled "IMAGE PROCESSING METHOD, DEVICE, EQUIPMENT AND STORAGE MEDIUM," each of which are incorporated herein by reference in their entirety.

FIELD OF THE TECHNOLOGY

This disclosure relates to the field of artificial intelligence technologies, and in particular, to an image processing method and apparatus, an electronic device, a non-transitory computer-readable storage medium, and a computer program product.

BACKGROUND OF THE DISCLOSURE

Artificial intelligence (AI) is a theory, method, technology, and application system that uses a digital computer or a machine controlled by a digital computer to simulate, extend, and expand human intelligence, perceive an environment, obtain knowledge, and use knowledge to obtain an optimal result. In other words, AI is a comprehensive technology in computer science, which attempts to understand the essence of intelligence and produce a new intelligent machine that can react in a manner similar to human intelligence. AI can involve the study of design principles and implementation methods of various intelligent machines, so that the machines have functions of perception, reasoning, and decision-making.

With the development of AI technologies, machine learning is used more and more to train models to help people complete complex calculations. In the image processing technology based on AI, an image classification model for classifying medical images can be trained, to determine attribute types of medical images through the image classification model. Conventionally labeled data used in an image processing method is based on manual labeling. However, manual labeling consumes a large amount of labor costs, is inefficient, and prone to errors.

SUMMARY

Embodiments of this disclosure provide an image processing method and apparatus, an electronic device, a non-transitory computer-readable storage medium, and a computer program product, which can improve image processing efficiency and accuracy.

An embodiment of this disclosure provides an image processing method performed by an electronic device. The method includes: performing classification processing on at least two first images and at least two second images through an image classification model, to obtain predicted classification results of the at least two first images and the at least two second images, the first image carrying a corresponding classification label, the second image carrying a corresponding pseudo classification label, the first image and the second image being images including to-be-recognized objects, the predicted classification result, the classification label, and the pseudo classification label being used for indicating an attribute type of the to-be-recognized object; acquiring a first loss value based on the predicted classification results and the corresponding classification labels of the at least two first images, and the predicted classification results and the corresponding pseudo classification labels of the at least two second images, the first loss value being used for indicating accuracy of the predicted classification result; acquiring a second loss value based on the predicted classification results and the corresponding pseudo classification labels of the at least two second images, the second loss value being used for indicating accuracy of the pseudo classification label; and updating a model parameter of the image classification model based on the first loss value and the second loss value, updating the corresponding pseudo classification labels based on the predicted classification results of the at least two second images, and then continuously performing classification processing, and acquisition of the first loss value and the second loss value until a target image classification model is obtained when a target condition is met.

An embodiment of this disclosure provides an image processing apparatus, including: an acquisition module, configured to: perform classification processing on at least two first images and at least two second images through an image classification model, to obtain predicted classification results of the at least two first images and the at least two second images, the first image carrying a corresponding classification label, the second image carrying a corresponding pseudo classification label, the first image and the second image being images including to-be-recognized objects, the predicted classification result, the classification label, and the pseudo classification label being used for indicating an attribute type of the to-be-recognized object; acquire a first loss value based on the predicted classification results and the corresponding classification labels of the at least two first images, and the predicted classification results and the corresponding pseudo classification labels of the at least two second images, the first loss value being used for indicating accuracy of the predicted classification result; and acquire a second loss value based on the predicted classification results and the corresponding pseudo classification labels of the at least two second images, the second loss value being used for indicating accuracy of the pseudo classification label; and an updating module, configured to: update a model parameter of the image classification model based on the first loss value and the second loss value; update the corresponding pseudo classification labels based on the predicted classification results of the at least two second images; and then continuously perform classification processing, and acquisition of the first loss value and the second loss value until a target image classification model is obtained when a target condition is met.

An embodiment of this disclosure provides an electronic device, including one or more processors and one or more memories, the one or more memories storing at least one piece of computer program, the at least one piece of computer program being loaded and executed by the one or more processors to implement various example implementations of the foregoing image processing method.

An embodiment of this disclosure provides a non-transitory computer-readable storage medium, storing at least one piece of computer program, the at least one piece of computer program being loaded and executed by a processor to implement various example implementations of the foregoing image processing method.

An embodiment of this disclosure provides a computer program product or a computer program, including one or more pieces of program code, the one or more pieces of program code being stored in a non-transitory computer-readable storage medium. One or more processors of an electronic device can read the one or more pieces of program code from the non-transitory computer-readable storage medium, and the one or more processors execute the one or more pieces of program code to enable the electronic device to perform the image processing method according to any one of the foregoing examples.

In an embodiment of this disclosure, a pseudo classification label is used for labeling the second image during training of the image classification model, and a corresponding loss value is designed based on the pseudo classification label, to indicate whether the pseudo classification label is correct. A model parameter is updated based on the loss value, and the pseudo classification label is updated during updating. In this case, only some images may correspond to classification labels. During model training, pseudo classification labels are generated for other images, that is, not all images need to correspond to classification labels, which can greatly reduce labor costs caused by manual labeling and therefore improve training efficiency. In addition, the pseudo classification label is continuously updated during model training, and finally a pseudo classification label with about the same accuracy as the classification label can be determined, to increase a quantity of training samples, thereby improving the accuracy of the image classification model.

BRIEF DESCRIPTION OF THE DRAWINGS

FIG. 2 is a flowchart of an example image processing method according to an embodiment of this disclosure.

FIG. 3 is a flowchart of an example image processing method according to an embodiment of this disclosure.

DESCRIPTION OF EMBODIMENTS

Figure 1:
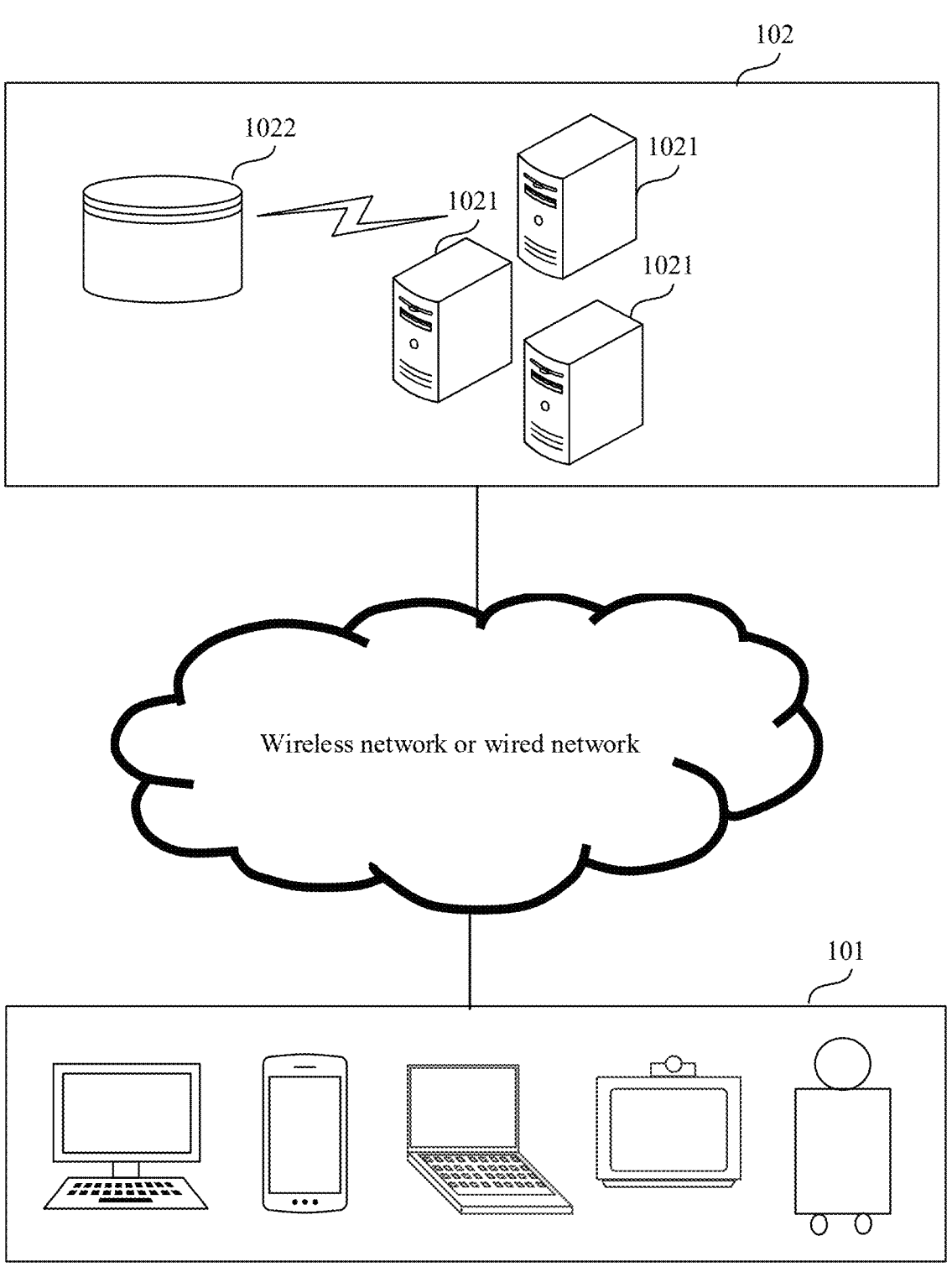
FIG. 1 is a schematic diagram of an example implementation environment of an image processing method according to an embodiment of this disclosure.

The objectives, technical solutions, and advantages of this disclosure are described in further detail below with reference to the accompanying drawings. The described embodiments are merely examples and are not intended to be limiting to this disclosure.

The terms "first", "second", and the like in this disclosure are used for distinguishing between same items or similar items of which effects and functions are basically the same. The "first", "second", and "nth" do not have a dependency relationship in logic or time sequence, and a quantity and an execution order thereof are not limited. Although terms such as "first" and "second" are used to describe various elements in the following description, these do not necessarily describe any order or priority. These terms are merely used for distinguishing one element from another element. For example, without departing from the scope of the various examples, a first image may be referred to as a second image, and similarly, a second image may be referred to as a first image. Both the first image and the second image may be images, and in some cases, may be separate and different images.

In this disclosure, "at least one" means one or more, and "plurality of" means two or more. For example, a plurality of data packets" means two or more data packets.

Further, sequence numbers of the processes do not necessarily indicate execution sequences in various embodiments of this disclosure. The execution sequences of the processes may be executed in a variety of orders, and may be determined based on functions and internal logic of the processes.

Determining B based on A does not mean that B is determined based solely A, but also means that B may be determined based on A and/or other information.

Terms related to this disclosure are described below.

A pseudo classification label (Pseudo Label) means that an approximate classification label of data without a classification label is given as a pseudo classification label according to data with a classification label. That is, for data without a classification label (for example, a medical image), a classification label is determined for the data without a classification label according to other data with a classification label. The classification label is not manually labeled, but calculated through some technical means, and therefore, may be referred to as a pseudo classification label. A pseudo classification labeling algorithm is a self-learning method, which is also widely applied to various classification tasks in the field of computer vision.

A medical image is an image related to a lesion or a diseased area collected through radiomics and computed tomography. An attribute type therein can be analyzed by processing the medical image. For example, whether there is a lesion therein, a position of the lesion, and a type of the lesion can be analyzed.

A lesion refers to a diseased part of a body, and limited diseased tissue with pathogenic microorganisms. For example, a certain part of a lung is destroyed by tuberculosis bacteria, and this part is a pulmonary tuberculosis lesion. For another example, otoscope data can be analyzed, to determine whether there is a lesion in an eardrum area and a type of the lesion.

An image classification model can be trained so that the image classification model is able to process an image, to replace manual calculation and obtain a type of a to-be-recognized object in the image. As an example, image collection may be performed on a disease-related human body part through a terminal (for example, a medical device), for example, collection is performed on a middle ear, to obtain an ear image, which may also be referred to as otoscope data. Image processing is performed on the ear image, to determine a position of an eardrum in the ear image and analyze a type of the eardrum, for example, a normal eardrum, a pathological eardrum, or the like. The pathological eardrum may also include eardrum sclerosis, myringitis, and the like. However, labeled data used during image processing is obtained based on manual labeling, and a manual labeling process consumes a large amount of labor costs, and is inefficient and prone to an error.

The embodiments of this disclosure provide an AI-based image processing method and apparatus, an electronic device, and a non-transitory computer-readable storage medium, which can use a pseudo classification label to label a second image during training of an image classification model and generate a pseudo classification label for the second image during model training, thereby greatly reducing the labor costs caused by manual labeling and improving the training efficiency.

This disclosure relates to the AI technologies, and an image classification model is trained, so that the image classification model is able to process a human tissue image, to replace manual calculation. AI is described below. The AI technologies are a comprehensive discipline and relate to a wide range of fields including both hardware-level technologies and software-level technologies. Basic AI technologies generally include technologies such as sensor, dedicated AI chip, cloud computing, distributed storage, a big data processing technology, operation/interaction system, and mechatronics. AI software technologies mainly include several major directions such as a computer vision technology, a speech processing technology, a natural language processing technology, and machine learning/deep learning.

The computer vision (CV) is a science that studies how to use a machine to "see." CV performs recognition, tracking, and measurement on a target using a camera and a computer instead of human eyes, and further performs graphics processing, so that the computer processes the target into an image suitable for human eyes to observe, or an image suitable for being transmitted to an instrument for detection. As a scientific subject, CV studies related theories and technologies, and attempts to establish an AI system that can obtain information from images or multi-dimensional data. The CV technology usually includes technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further includes biological feature recognition technologies such as common face recognition and fingerprint recognition.

Machine learning (ML) is an interdisciplinarity involving a plurality of disciplines such as the probability theory, statistics, approximation theory, convex analysis, algorithm complexity theory, and the like. ML specializes in studying how a computer simulates or implements a human learning behavior to acquire new knowledge or skills, and reorganize an existing knowledge structure, so as to keep improving its performance. The ML, as the core of AI, is a basic way to make the computer intelligent, and is applicable to various fields of AI. ML and deep learning generally include technologies such as an artificial neural network, a belief network, reinforcement learning, transfer learning, inductive learning, and learning from demonstrations.

The solutions provided in the embodiments of this disclosure involve technologies such as image processing and ML in the CV of AI, and are described by using the following embodiments.

An implementation environment of this disclosure is described below.

FIG. 1 is a schematic diagram of an implementation environment of an image processing method according to an embodiment of this disclosure. The implementation environment includes a terminal 101, or the implementation environment includes a terminal 101 and an image processing platform 102. The terminal 101 is connected to the image processing platform 102 by using a wireless network or a wired network.

The terminal 101 (on which a client such as a medical client runs) can be configured to acquire a medical image. For example, an image is collected through an image collection apparatus of the terminal 101, or an image collected through another image collection device is transmitted to the terminal 101, and the terminal 101 receives the image including a to-be-recognized object. An image processing plug-in may be implanted into the client running in the terminal to locally implement the image processing method on the client. For example, after acquiring a request for training an image classification model, the terminal 101 invokes the image processing plug-in to implement the image processing method, that is, to train the image classification model configured to classify the to-be-recognized object and obtain an attribute type.

As an example, the image may be an image in various disclosure scenarios. For example, in a medical scenario, when the image is a medical image, the to-be-recognized object is image content related to a lesion, and may be a middle ear area, a shadow portion in B-scan ultrasonography, or the like. The attribute type is a type of the lesion. In an automated driving scenario, when the image is a traffic image, the to-be-recognized object is a road element, and the attribute type of the to-be-recognized object is an attribute type of the road element, such as a road guide line or a signal light. In a facial recognition scenario, when the image is a facial image, the to-be-recognized object is a face in the facial image, and the attribute type of the to-be-recognized object is an age group type and a gender type of the face. Example descriptions are provided below by using an example in which the image is a medical image.

In some embodiments, after obtaining the request for training the image classification model, the terminal 101 invokes an image processing interface (which can be provided in the form of a cloud service, that is, an image processing service) of the image processing platform 102. The image processing platform 102 trains the image classification model according to the medical image, for example, after a patient, a doctor, or a researcher inputs the medical image into a medical application, the medical application invokes the image processing interface of the image processing platform 102 to train the image classification model, so that the image classification model has a capability to distinguish an attribute type of the medical image. The image processing method provided in this embodiment of this disclosure does not aim at a living or an animal body, and does not directly aim at obtaining a disease diagnosis result or a health condition, and therefore, the disease diagnosis result or the health condition is not directly obtained. That is, the attribute type is not directly used in disease diagnosis, and is merely used as intermediate data, to assist the patient in disease prediction, and assist the doctor and researcher in disease diagnosis and re-diagnosis, and treatment method research.

Exemplarily, the terminal 101 can have an image collection function and an image processing function, can process a collected image, and can execute a corresponding function according to a processing result. For example, the terminal 101 may be an otoscope device. In some embodiments, the terminal 101 may be a portable otoscope device. Exemplarily, the image processing platform 102 can have an image collection function and an image processing function, can process a collected image, and can execute a corresponding function according to a processing result. Exemplarily, the terminal 101 can independently complete this work, and can also provide a data service through the image processing platform 102. This can be performed in a variety of manners. For example, the terminal can transmit the collected and labeled medical image to the image processing platform 102, and the image processing platform 102 performs the image processing method according to the received first image and second image.

The image processing platform 102 includes at least one of a server, a plurality of servers, a cloud computing platform, and a virtualization center. The image processing platform 102 is configured to provide a background service to an application program supporting image processing. For example, the image processing platform 102 undertakes primary processing work, and the terminal 101 undertakes secondary processing work. Alternatively, the image processing platform 102 undertakes secondary processing work, and the terminal 101 undertakes primary processing work. Alternatively, the image processing platform 102 or the terminal 101 may separately undertake processing work. Alternatively, a distributed computing architecture is used between the image processing platform 102 and the terminal 101 to perform collaborative computing.

As an example, the image processing platform 102 includes at least one server 1021 and a database 1022. The database 1022 is configured to store data. In this embodiment of this disclosure, the database 1022 can store a sample medical image or a trained image classification model, to provide a data service for the at least one server 1021.

In some embodiments, the server 1021 in the image processing platform 102 may be a node device in a block-chain system, and the server 1021 may store the sample medical image or the image classification model obtained based on image training to a blockchain in the blockchain system. In some embodiments, the blockchain system can provide the image processing service. When the electronic device performs image classification, an image classification request can be transmitted to the blockchain system, and the node device in the blockchain system responds the image classification request to classify the image.

The electronic device for performing image processing provided by the embodiments of this disclosure may be various types of terminals or servers. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, an audio playback device, a video playback device, a medical device, a vehicle, or other suitable device. An application program supporting image processing is installed and run on the terminal. For example, the application program may be a system application, an image processing application, or the like. The terminal and the server may be directly or indirectly connected in a wired or wireless communication manner.

As an example, a server may be a server cluster deployed in the cloud, and open AI as a Service (AIaaS) to users. A platform splits several types of common AI services and provides independent or packaged services in the cloud. Such a service mode is similar to an AI-themed mall. All users can access one or more AI services provided by the AIaaS platform via application programming interfaces.

For example, one of the AIaaS may be an image processing service, that is, an image processing program provided by an embodiment of this disclosure is packaged in a server in the cloud. The users invoke the image processing service in the cloud service through the terminal (on which a client such as a map positioning client or a medical client runs), so that the server deployed in the cloud invokes the packaged image processing program. The image processing method provided in this embodiment of this disclosure does not aim at a living or an animal body, and does not directly aim at obtaining a disease diagnosis result or a health condition. Therefore, the disease diagnosis result or the health condition is not directly obtained according to event development information of the disease type, and is merely used to assist a doctor and a researcher in disease diagnosis and re-diagnosis, and treatment method research.

There may be more or fewer terminals 101 or servers 1021. For example, there may be one terminal 101 or server 1021, or there may be dozens of or hundreds of terminals 101 or servers 1021 or more. The number and type of terminals and/or servers may vary.

FIG. 2 is a flowchart of an image processing method according to an embodiment of this disclosure. The method is applied to an electronic device, and the electronic device is a terminal or a server. Referring to FIG. 2, an example is which the method is applied to a terminal is used, and the method includes the following steps.

201. The terminal performs classification processing on at least two first images and at least two second images through an image classification model, to obtain predicted classification results of the at least two first images and the at least two second images, the first image carrying a corresponding classification label, the second image carrying a corresponding pseudo classification label, the first image and the second image being images including to-be-recognized objects, the predicted classification result, the classification label, and the pseudo classification label being used for indicating an attribute type of the to-be-recognized object.

The image may be an image in various application scenarios, for example, the image is a medical image or a traffic image. When the image is a medical image, the to-be-recognized object is image content related to a lesion, and may be a middle ear area, a shadow portion in B-scan ultrasonography, or the like. Examples are described by way of using an example in which the image is a medical image. A difference between the first image and the second image is that the first image and the second image are labeled differently. The first image carries a classification label, and the classification label is used for representing a correct classification result or a true classification result of the image. The classification label may be manually labeled. For example, there may be one or more classification categories. For example, there are 5 classification categories in total, and five classification labels of 0, 1, 2, 3, and 4 are set to respectively label the 5 classification categories. Each classification label corresponds to a classification category, and a correct classification result of an image carrying a classification label can be learned through the classification label. The correct classification result refers to a classification category to which the classified image belongs. The second image carries a pseudo classification label. Compared with the foregoing classification label, the pseudo classification label is not manually labeled, but is a label similar to the classification label assigned to the image by processing the image.

In this embodiment of this disclosure, the pseudo classification label may be generated during training of the image classification model, and a model parameter of the image classification model is continuously optimized during training. Therefore, the pseudo classification label is also continuously optimized during training.

The first image and the second image are sample images, and may also be referred to as sample medical images. The predicted classification result is a predicted result obtained through the image classification model. The classification label and the pseudo classification label are used for indicating true values, and correct or true results. These sample images are processed through the image classification model, and whether the predicted classification result obtained by the image classification model is correct is analyzed based the predicted classification result obtained through the image classification model, and the classification label or the pseudo classification label carried by the sample image, to optimize the model parameter of the image classification model, thereby improving processing performance of the image classification model.

As an example, the predicted classification result, the classification label, and the pseudo classification label are used for indicating the attribute type of the image. The attribute type may be a type of some attributes in the image. For example, the attribute may be a lesion in the image, and the medical image may be an ear image, which may also be referred to as an otoscope image. The foregoing predicted classification result, the classification label, and the pseudo classification label may be used for indicating a type of the eardrum in the ear image. The type may be normal or abnormal. When the type is normal, the normal type may further include complete health, heath, or recovery. When the type is abnormal, the abnormal type may further include myringitis, eardrum sclerosis, and the like. For another example, the attribute may also be another attribute in the image, such as image definition, an image collection distance, hue, an image style, or the like. This is merely an example description. The type may be set on a variety of factors and objectives.

202. The terminal acquires a first loss value based on the predicted classification results and the corresponding classification labels of the at least two first images, and the predicted classification results and the corresponding pseudo classification labels of the at least two second images, the first loss value being used for indicating accuracy of the predicted classification result.

The terminal may evaluate whether the predicted classification result is correct according to the label carried by the image after determining the predicted classification result, to measure the processing performance of the image classification model.

The first loss value herein is used as a measurement indicator of the processing performance. By comparing the predicted result (the predicted classification result) with a correct result (the classification label or the pseudo classification label), accuracy of the predicted result can be determined. The more accurate of the predicted classification result is, the better the processing performance of the image classification model is. An objective of model training is to improve the processing performance of the image classification model.

203. The terminal acquires a second loss value based on the predicted classification results and the corresponding pseudo classification labels of the at least two second images, the second loss value being used for indicating accuracy of the pseudo classification label.

In this embodiment of this disclosure, not only the accuracy of the predicted classification result is determined based on the predicted classification result and the classification label or the pseudo classification label, to improve classification accuracy of the model, but also accuracy of the pseudo classification label can be estimated, to further determine the accuracy of the image classification model, so that the pseudo classification label will be updated again based on the predicted classification result at a next training stage. Through a training process with a plurality of stages, the pseudo classification label becomes more and more accurate, and the image classification model can perform classification more and more accurately.

204. The terminal updates a model parameter of the image classification model based on the first loss value and the second loss value, updates the corresponding pseudo classification labels based on the predicted classification results of the at least two second images, and then continuously performs classification processing, and acquisition of the first loss value and the second loss value until a target image classification model is obtained when a target condition is met.

The following example processing is performed when the target condition is not met: updating the corresponding pseudo classification labels based on the predicted classification results of the at least two second images; performing classification processing on the at least two first images and the at least two second images through an image classification model obtained by updating the model parameter, to obtain updated predicted classification results of the at least two first images and the at least two second images; and re-updating, based on the updated predicted classification results of the at least two first images and the at least two second images, the classification labels corresponding to the at least two first images, and updated pseudo classification labels corresponding to the at least two second images, a model parameter of the image classification model obtained through updating. The image classification model obtained by updating the model parameter is determined as the target image classification model when the target condition is met.

The foregoing step 201 is an iterative process. The terminal can update the model parameter based on the loss value after acquiring a loss value, and then can update the pseudo classification label used at a next stage. Through a plurality of iterative processes, the classification accuracy of the image classification model is gradually improved, and the target image classification model meeting the condition can be obtained. The target image classification model is a trained model.

In this embodiment of this disclosure, the pseudo classification label is used for labeling the second image during training of the image classification model, and the corresponding loss value is designed based on the pseudo classification label, to indicate whether the pseudo classification label is correct. The model parameter is updated based on the loss value, and the pseudo classification label is also updated during updating. In this case, only some images may correspond to classification labels. During model training, pseudo classification labels are generated for other images, that is, not all images correspond to classification labels, which can greatly reduce labor costs caused by manual labeling and therefore improve training efficiency. In addition, the pseudo classification label is continuously updated during model training, and finally a pseudo classification label with about the same accuracy as the classification label can be determined, to increase a quantity of training samples, thereby improving the accuracy of the image classification model.

FIG. 3 is a flowchart of an image processing method according to an embodiment of this disclosure. Referring to FIG. 3, the method may include the following steps.

301. A terminal acquires at least two first images and at least two second images, the first image carrying a corresponding classification label, the first image and the second image being medical images.

In this embodiment of this disclosure, two kinds of images are included: the first image and the second image. Both the first image and the second image are sample images used during training of an image classification model. The two kinds of images are classified according to presence or absence of the classification label. The image with the classification label is referred to as the first image, and the image without the classification label is referred to as the second image. The classification label is a true classification label.

302. The terminal acquires initial predicted classification results of the at least two first images and the at least two second images based on the image classification model.

The terminal may invoke the image classification model, which may be an initial model. A model parameter of the image classification model may be optimized.

When acquiring a predicted classification result based on the image classification model, the terminal may first perform feature extraction on an image, and then classify the image based on an image feature. That is, in step 302, the electronic device may input the at least two first images and the at least two second images into the image classification model, perform feature extraction on the at least two first images and the at least two second images through the image classification model, to obtain image features of the at least two first images and the at least two second images; and classify the first images and the second images based on the image features of the at least two first images and the at least two second images, to obtain the predicted classification results of the first images and the second images.

At this stage, the first image carries a corresponding classification label, while the second image does not carry a corresponding classification label. Therefore, processing to obtain the pseudo classification label of the second image according to the predicted classification result may be performed at this stage. In this way, at a next stage, the second image may carry the pseudo classification label and participate in a classification loss.

Figure 4:
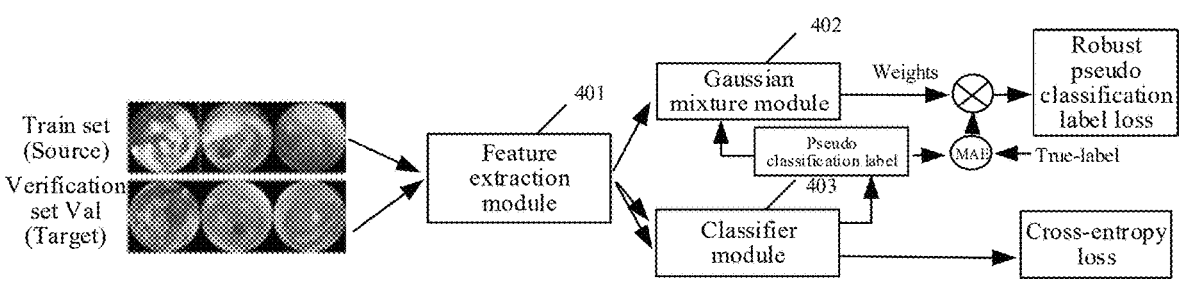
FIG. 4 is a schematic diagram of an example training system framework according to an embodiment of this disclosure.

A system framework of the method provided in this application is described below by using an example. The system framework for training the image classification model is shown in FIG. 4. The system framework mainly includes three modules: a feature extraction module (F) 401, a Gaussian mixture module (G) 402, and a classifier module (C) 403.

The feature extraction module 401 is configured to extract a learnable deep feature representation type, and a predicted result corresponding to input data can be learned by inputting the representation type into a classifier. That is, the feature extraction module 401 is configured to extract an image feature of an image.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

For the at least two first images and the at least two second images, the at least two first images and the classification labels corresponding to the first images may be referred to as a source domain data set. $(X_S, Y_S)$ are used for representing an image and a true classification label of the source domain date set (that is, a train set). The at least two second images and the pseudo classification labels corresponding to the second images may also be referred to as a target domain data set, and $(X_T, Y_T)$ are used for representing an image and a pseudo classification label of the target domain data set (that is, a verification set).

For the source domain data set and the target domain data set, the feature extraction module 401 (which may be a feature extraction network (F)) is first configured to extract feature representation types (that is, the image features) from source domain data and target domain data, and then the image features $(F_S, F_T)$ of a source domain and a target domain are inputted into the classifier module 403 (which may be a classifier (C)), and subsequently, predicted results $(P_S, P_T)$ of the source domain and the target domain, that is, the predicted classification results, are outputted through the classifier module 403. The predicted result of the target domain is inputted into the Gaussian mixture module 402 (which may be a Gaussian mixture model), to calculate a weight of importance of the predicted result and the estimated pseudo classification label. The Gaussian mixture module 402 is configured to calculate the foregoing weight. The weight will participate in calculation of a robust pseudo classification label loss (Robust Pseudo-label Loss) function together with the pseudo classification label, to learn a more accurate target set test result, that is, the process of acquiring the second loss value. For descriptions of the Gaussian mixture module 402, reference may be made to the following step 307. Processes in which the image classification model performs feature extraction and classification are merely described herein.

The feature extraction module 401 and the classifier module 403 may be any deep learning network structure. For example, the feature extraction module and the classier module may use a residual network (ResNet50) or another network structure, for example any deep learning network such as an efficient network (EfficientNet), a mobile network (MobileNet), and a dense network (DenseNet). In some embodiments, the foregoing feature extraction module 401 may use a network before a fully-connected layer of the ResNet50, and the classifier 403 may use the last fully-connected layer. The pseudo classification label is calculated based on the predicted result of the target domain outputted by the fully-connected layer.

303. The terminal acquires an initial first loss value based on the classification label carried in the first image and the predicted classification result of the first image.

After the terminal predicts the predicted classification results of the first image and the second image through the image classification model, where the predicted classification result is a predicted value, since the first image also carries a true label, that is, a true value, the terminal may train the model based on an error between the predicted value and the true value. The first loss value may be used for indicating accuracy of the predicted classification result of the first image. The first loss value is used for determining accuracy of a classification result of the image classification model, and may also be referred to as a classification loss. The medical image classification process may also be a segmentation process. Therefore, the classification process may also be referred to as a segmentation process, and the classification loss may also be referred to as a segmentation loss.

In some embodiments, the first loss value may be a value of a cross-entropy loss function. Through the cross-entropy loss function, an error between the classification label and the predicted classification result can be calculated, to measure a classification capability of the image classification model. It may be that when the first loss value is a cross-entropy loss value, the larger the first loss value is, the larger the error between the predicted classification result and the classification label is, and the worse the classification capability of the image classification model is. The smaller the first loss value is, the smaller the error between the predicted classification result and the classification label is, and the better the classification capability of the image classification model is.

In some embodiments, the first loss value may alternatively be obtained through another loss function, such as L1 or L2.

304. The terminal updates the model parameter of the image classification model based on the first loss value.

The terminal can update the model parameter based on the first loss value after acquiring the first loss value. The model parameter updating process may be implemented through any model updating algorithm. In some embodiments, the updating process may be implemented through a Stochastic Gradient Descent (SGD) algorithm. Any suitable algorithm may be used for the updating process.

305. The terminal acquires the pseudo classification labels corresponding to the at least two second images based on the predicted classification results of the at least two second images.

The corresponding classification label is originally not carried in the second image, and therefore may be calculated based on the predicted classification result so that the second image can carry the corresponding pseudo classification label at a next stage, and then participate in calculation of the classification loss, to expand the sample images, thereby further improving the accuracy of the image classification model. In addition, in this process, a pseudo classification label with good accuracy can be calculated for the second image.

In some embodiments, the terminal can cluster the images when acquiring the pseudo classification label, and determine the pseudo classification label based on a clustering result. The terminal can cluster the at least two first images and the at least two second images, to obtain the clustering result. The clustering result includes at least two clustering centers and an image corresponding to each of the clustering centers. A weight of each of the second images is acquired according to a distance between each of the second images and the clustering center to which each of the second images belongs.

For example, the pseudo classification label may be implemented through the following formula:

$$\overline{Y}_T = \mathrm{argmax}_k [C(F(X_T))]_k,\qquad \text{formula 1}$$

$\overline{Y}_T$ is used for indicating the pseudo classification label, and $\mathrm{argmax}_k$ is a function for solving a parameter (set) of a function and refers to $x_k$ when $C(F(X_T))$ obtains a maximum value. $[\cdot]_k$ represents a kth clustering center calculated by using cosine similarity (that is, $$\mathrm{sim}(u, v) = 1 - \frac{u^T v}{\|u\|\|v\|}$$

$C()$ refers to the classification process, and $F(X_T)$ means that feature extraction is performed on the second image $X_T$.

306. The terminal acquires the predicted classification results of the at least two first images and the at least two second images based on the image classification model, the first image carrying the corresponding classification label, the second image carrying the corresponding pseudo classification label.

Step 306 is similar to the foregoing step 302.

307. The terminal acquires the first loss value based on the predicted classification results and the corresponding classification labels of the at least two first images, and the predicted classification results and the corresponding pseudo-classifications labels of the at least two second images, the first loss value being used for indicating accuracy of the predicted classification result of the image.

At this stage, the first image and the second image correspond to the classification label or the pseudo classification label, and therefore the two kinds of images can participate in the calculation of the classification loss or the segmentation loss. In this case, the terminal can calculate the first loss value based on the predicted classification results and the classification label, or the pseudo classification label of the two kinds of images.

Step 307 is similar to the foregoing step 303. Differently, in step 307, the second image corresponds to the pseudo classification label, and therefore can participated in the calculation of the classification loss or segmentation loss. In this case, the terminal also calculates the error between the predicted classification result and the pseudo classification label of the second image when acquiring the first loss value.

308. The terminal acquires a second loss value based on the predicted classification results and the corresponding pseudo classification labels of the at least two second images, the second loss value being used for indicating accuracy of the pseudo classification label.

For the pseudo classification label, the terminal may further estimate whether the pseudo classification label is accurate, whether it is a true classification label, or whether it is closer to a true classification label. Therefore, the terminal may further acquire the second loss value based on the predicted classification result and the pseudo classification label of the second image, to determine whether the pseudo classification label is accurate.

The terminal may acquire the errors between the predicted classification results and the corresponding pseudo classification labels of the at least two second images, and then perform weighting on the errors corresponding to the at least two second images according to the weights of the at least two second images, to obtain the second loss value. By setting a weight for each second image, the weight of the second image is adaptively adjusted according to whether the pseudo classification label is accurate, thereby ensuring the accuracy of the pseudo classification label.

In some embodiments, the weight can be acquired in a clustering manner. For images of the same category, distribution of image features thereof is relatively similar. Therefore, by clustering the images and according to the distances between the images and different clustering centers, the attribute type of the second image can be analyzed, which can naturally reflect a possibility that the pseudo classification label is a correct classification label. For an image that is classified more accurately, a relatively high weight may be set for the image; and for an image that is classified more poorly, a relatively low weight may be set for the image. That is, the foregoing weight may correspond to whether the pseudo classification label of the second image is a correct classification label. In other words, the weight may correspond to the probability of whether the pseudo classification label of the second image is a correct classification label.

The terminal may cluster the at least two first images and the at least two second images, to obtain at least two clustering centers, and acquire the weight of each of the second images according to the distance between each of the second images and the clustering center to which each of the second images belongs. The weight of each of the second images is acquired based on the distance between each of the second images and the clustering center to which each of the second images belongs, to effectively improve accuracy of the weight, thereby improving accuracy of the subsequent second loss value.

In some embodiments, the foregoing clustering is performed for clustering images with similar image features, so that distribution conditions of the images of different types can be determined in an image feature level, thereby performing feature distance modeling on a category center in a feature space to obtain an accurate weight. The terminal may acquire a possibility corresponding to each of the images according to the distance between each of the second images and the clustering center to which each of the second images belongs, the probability being a probability that the pseudo classification label is a correct classification label; and then acquire the weight of each of the images based on the probability corresponding to each of the second images. The weight is described by using the probability, which can effectively improve the accuracy and effectiveness of the second loss value, thereby improving efficiency of model training.

In some embodiments, for a relationship between the probability and the weight, the terminal can acquire the probability as the weight of the second image in response to the probability corresponding to any second image being greater than or equal to a probability threshold. The terminal can acquire a zero value as the weight of the second image in response to the probability corresponding to any second image being less than the probability threshold.

The probability threshold may be set to meet desired requirements, for example, the probability threshold may be 0.5. This threshold may vary based on a variety of factors. Through the foregoing method, a relatively high weight is set for the image that is classified accurately, and a relatively low weight is set for the image that is classified inaccurately, to further improve the accuracy of the weight and improve the accuracy of the pseudo classification label.

In some embodiments, step 308 may be implemented through a Gaussian mixture model. The at least two second images, and the predicted classification results and the corresponding pseudo classification labels of the at least two second images are processed based on the Gaussian mixture model, to obtain the second loss value. That is, the electronic device may input the predicted classification result and the pseudo classification label of the second image into the Gaussian mixture model, and the Gaussian mixture model processes input data, to output the second loss value.

The Gaussian mixture model means that an object is accurately quantized by using a Gaussian probability-density function (normal distribution curve), and is a model that decomposes an object into pieces and is formed based on the Gaussian probability-density function (normal distribution curve).

In some embodiments, the electronic device may further update a model parameter of the Gaussian mixture model based on the second loss value.

For example, for a source domain ( $$X_S:\{x_s^i, y_s^i\}_{i=1}^{N_S}$$

image of a target domain $$X_T:\{x_t^j\}_{j=1}^{N_T}$$

image, outputs $P_S=C(F(X_S)) \in \mathbb{R}^K$ and $P_T=C(F(X_T))\in \mathbb{R}^K$ of the classification network respectively represent the predicted classification results of the source domain data and the target domain data.

$$\overline{Y}_T:\{\overline{y}_t^j\}_{j=1}^{N_T}$$

represents the pseudo classification label of the target domain data, where K represents a quantity of classification categories, and $N_S$, $N_T$ respectively represent a quantity of the source domain images and a quantity of the target domain images. The weight may be implemented through the following formula 2:

$$w(x_t^j) = \begin{cases} P(z_j = 1|x_t^j, \overline{y}_t^j), & \text{if } P(z_j = 1|x_t^j, \overline{y}_t^j) \ge 0.5 \\ 0, & \text{otherwise} \end{cases} \quad \text{formula 2}$$

$P(z_j=1|x_t^j, \overline{y}_t^j)$ represents the probability that the pseudo classification label estimated by the model is a correct classification label, where $z_j\in\{0,1\}$ is an intermediate variable introduced for a pseudo classification label of each target domain sample, and represents whether the predicted pseudo classification label is accurate ($Z_j=1$) or inaccurate ($z_j=0$). It can be learned from formula 2 that, when the probability that the estimated pseudo classification label is a correct classification label is less than 0.5, the pseudo classification label will be removed. The probability that the pseudo classification label is a correct classification label is calculated by using the Gaussian mixture model and distances between a data feature and different category centers.

309. The terminal updates the model parameter of the image classification model based on the first loss value and the second loss value, updates the corresponding pseudo classification labels based on the predicted classification results of the at least two second images, and then continuously performs the classification and loss value acquisition steps until a target image classification model is obtained when a target condition is met.

The terminal integrates the two loss values to update the model parameter. During integration, a target loss value may be acquired based on the first loss value and the second loss value, and the model parameter is updated based on the target loss value.

In some embodiments, the terminal may perform weighting on the first loss value and the second loss value, to obtain the target loss value. The target loss value is obtained by performing weighting on the first loss value and the second loss value, to improve the training efficiency when training is performed based on the target loss value. When the weight is 1, the terminal may use a sum of the first loss value and the second loss value as the target loss value, for example, the target loss value is represented by $\mathcal{L}_{total}$, as shown in the following formula 3.

$$\mathcal{L}_{total} = \mathcal{L}_{class}(X_S, Y_S) + \mathcal{L}_{robust}(X_T, \overline{Y}_T), \qquad \text{formula 3}$$

$$\mathcal{L}_{class}(X_S, X_S) = -\sum_{i=1}^{N_S}\sum_{k=1}^{K} y_s^{lk} \log\, p_s^{lk}, \qquad \text{formula 4}$$

$$\mathcal{L}_{robust}(F, C, w) = \frac{1}{N_w}\sum_{j=1}^{N_T} w(x_t^j) MAE(p_t^j, \overline{y}_t^j), \qquad \text{formula 5}$$

$(X_S, Y_S)$ represents the source domain data, $X_S$ refers to the first image, and $Y_S$ refers to the classification label carried in the first image. $(X_T, Y_T)$ represents the target domain data, $X_T$ refers to the second image, and $\overline{Y}_T$ refers to the pseudo classification label carried in the second image. $\mathcal{L}_{class}$ is a cross entropy loss function of the first image $X_S$ and the classification label $Y_S$ carried in the first image in the source domain data, and $\mathcal{L}_{robust}$ is a robust loss function of the second image and the pseudo classification label predicted by the second image in the target domain data, that is, the second loss value. w is a weight indicating that the pseudo classification label is a correct classification label, $$N_w = \sum_{j=1}^{N_T} w(x_t^j),$$

and MAE(·) represents a mean absolute error. F refers to the feature extraction module, and C refers to the classifier module. The outputs $P_S = C(F(X_S)) \in \mathbb{R}^K$ and $P_T = C(F(X_T)) \in \mathbb{R}^K$ of the classification network respectively represent the predicted classification results of the source domain data and the target domain data, where K represents the quantity of classification categories, and $N_S$, $N_T$ respectively represent a quantity of the first images and a quantity of the second images.

In an example, the first loss value merely includes a cross-entropy loss function calculated by the first image, but does not include a cross-entropy loss function calculated by the second image. The terminal may determine, according to settings, whether to include the cross-entropy loss function calculated by the second image into the first loss value. During initial iteration, when the second image has not acquired the pseudo classification label, the cross entropy loss function cannot be calculated, and therefore may not be included into the first loss value. When the second image has already carried the pseudo classification label, the calculated cross entropy loss function may be included into the first loss value.

In some embodiments, the terminal may further acquire predicted types of the at least two first images and the at least two second images according to the at least two first images, the at least two second images, and the corresponding predicted classification results, the predicted type being used for indicating whether a particular image of the at least two first images and the at least two second images is the first image or the second image; and acquire a third loss value according to predicted types of the at least two first images and the at least two second images, the third loss value being used for indicating accuracy of the predicted type. Correspondingly, in step 309, the terminal may update the model parameter of the image classification model based on the first loss value, the second loss value, and the third loss value.

In some embodiments, the terminal may discriminate types of the at least two first images and the at least two second images based on a discriminative network and according to the at least two first images, the at least two second images, and the corresponding predicted classification results, to obtain the predicted types of the at least two first images and the at least two second images; and then update a network parameter of the discriminative network according to the third loss value, to perform training in a manner of alternatively updating a segmentation network and the discriminative network, thereby effectively improving the efficiency of model training.

That is, a phased training manner is used during training. The pseudo classification label is generated by using a training result from the previous stage and applied to a segmentation network training process at the current stage. At each stage, the segmentation network and the discriminative network are trained together in an alternative updating manner.

During training, image data is first inputted into the segmentation network, and the true classification label of the source domain data and the pseudo classification label of the target domain data are used for calculating the segmentation loss $\mathcal{L}_G$, that is, the foregoing classification loss or the first loss value. Then, a parameter of the segmentation network is updated by minimizing the segmentation loss. After the segmentation, the source domain data and the target domain data may further be discriminated through the discriminative network, so that data classification of the two domains is more similar through discrimination. Segmentation results $P_S$ and $P_T$ outputted by the segmentation network are simultaneously inputted into the discriminative network, and an adversarial loss $\mathcal{L}_D$ is calculated by using an information entropy result generated by $P_T$. The adversarial loss $\mathcal{L}_D$ is the foregoing third loss value of the predicted type obtained through discrimination. Then, the parameter of the discriminative network may be updated by maximizing the adversarial loss. Subsequently, an error generated by an adversarial loss function may be transmitted back to the segmentation network. The parameter of the segmentation network is updated by minimizing the adversarial loss, so that the segmentation results of the source domain image and the target domain image predicted by the segmentation network become more and more similar, thereby achieving domain adaptation. In this embodiment of this disclosure, during optimization of the network parameter, an SGD algorithm may be used for optimizing and training the segmentation network (image classification model), and an Adam algorithm may be used for optimizing and training the discriminative network.

The foregoing target condition may be that the loss value converges, or may be that a quantity of iterations reach a target quantity of times. The target condition may also be related to a learning rate. In an example, initial learning rates of the segmentation network and the discriminative network are respectively $2.5 \times 10^{-4}$ and $1 \times 10^{-4}$. The learning rate can affect how fast the model converges.

Figure 5:
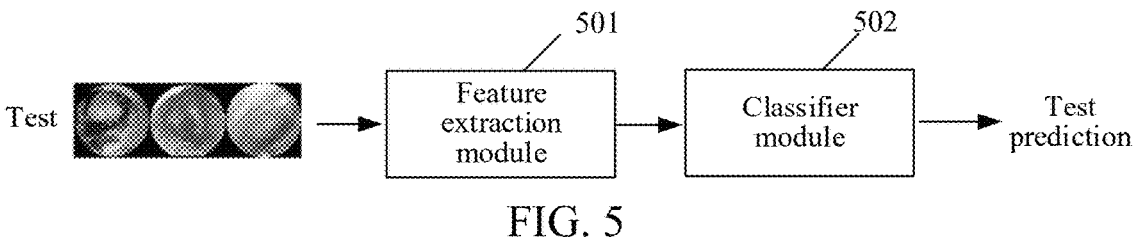
FIG. 5 is a flowchart of an example image processing method according to an embodiment of this disclosure.

After training the image classification model, the terminal may apply the image classification model to an image classification scenario. For example, the image classification scenario may be an otoscope data segmentation scenario. The terminal may acquire a third image in response to an image processing instruction, the third image being a medical image; input the third image into the target image classification model; perform feature extraction on the third image through the target image classification model; and classify the third image based on an extracted image feature, to obtain an attribute type of a to-be-recognized object in the third image. Similarly, the attribute type may be determined according to the image classification scenario. For example, in the otoscope data segmentation scenario, the to-be-recognized object is an ear image, and the attribute type may be a type of an eardrum. For another example, in a brain image segmentation scenario, the attribute type may refer to whether human tissue is a brain tumor or a brain cancer. For another example, in an image collection distance classification scenario, the attribute type may refer to a long distance or a short distance, or the like. The process may also be considered as a training process of the model. The acquired image is accurately classified through the trained model. For example, as shown in FIG. 5, a test set may be inputted into the trained image classification model including a feature extraction module 501 and a classifier module 502. Finally, a predicted result of the test set, that is, a test prediction, is outputted by the classifier module 502

In this embodiment of this disclosure, the pseudo classification label is used for labeling the second image during training of the image classification model, and the corresponding loss value is designed based on the pseudo classification label, to indicate whether the pseudo classification label is accurate. The model parameter is updated based on the loss value, and the pseudo classification label is also updated during updating. In this case, only some images may correspond to classification labels. During model training, pseudo classification labels are generated for other images, that is, not all images correspond to classification labels, which can greatly reduce labor costs caused by manual labeling and therefore improve training efficiency. In addition, the pseudo classification label is continuously updated during model training, and finally a pseudo classification label with about the same accuracy as the classification label can be determined, to increase the quantity of the training samples, thereby improving the accuracy of the image classification model.

Any combination of the foregoing may be used to form other example embodiments of this disclosure.

During implementation of this embodiment of this disclosure, otoscope data including 9804 images is used, where cholesteatoma data, chronic suppurative otitis media data, and normal data respectively include 4175 images, 2281 images, and 3348 images. The data (category) is (proportionally) divided into a training set, a verification set, and a test set by patients (that is, data of the same patient is not divided). The training set includes 8710 images, and the verification set and the test set respectively include 548 images and 546 images. Sizes of the images are all resized to 256×256. During the test, the verification set including 546 images is used for testing the result.

The ResNet50 is used as a basic network, and the algorithms provided in this embodiment of this disclosure are added to the ResNet50 to perform method verification. A large quantity of experiments are performed based on training data of different sizes (that is, 10% to 100% of the data are respectively used). Experimental results are shown in Table 1 and Table 2. It can be learned that, by using the algorithms provided in this embodiment of this disclosure, performance of classifying a lesion of the otitis media based on the medical image can be significantly improved for training data with different quantities of samples.

TABLE 1

Experimental results of the ResNet50 based on the training data with different quantities of samples

| | Precision | Accuracy | Recall rate | Score |
|---|---|---|---|---|
| Train10%_val | 0.424908 | 0.7606 | 0.4249 | 0.5166 |
| Train20%_val | 0.554945 | 0.7601 | 0.5549 | 0.6086 |
| Train30%_val | 0.622711 | 0.8773 | 0.6227 | 0.6904 |
| Train40%_val | 0.589744 | 0.8077 | 0.5897 | 0.6531 |
| Train50%_val | 0.745421 | 0.9560 | 0.7454 | 0.8023 |
| Train60%_val | 0.771062 | 0.9414 | 0.7711 | 0.8216 |
| Train70%_val | 0.787546 | 0.9766 | 0.7875 | 0.8512 |
| Train80%_val | 0.785714 | 0.9432 | 0.7857 | 0.8361 |
| Train90%_val | 0.776557 | 0.9799 | 0.7766 | 0.8325 |
| Train100%_val | 0.695971 | 0.7970 | 0.6960 | 0.7157 |

TABLE 2

Experimental results obtained by using the algorithm provided in this embodiment of this disclosure

| | Precision | Accuracy | Recall rate | Score |
|---|---|---|---|---|
| Train10%_val | 0.84065 | 0.847825 | 0.84065 | 0.83403 |
| Train20%_val | 0.80952 | 0.83458 | 0.80952 | 0.79803 |
| Train30%_val | 0.92307 | 0.92425 | 0.92307 | 0.92213 |
| Train40%_val | 0.86080 | 0.87482 | 0.86080 | 0.85966 |
| Train50%_val | 0.92124 | 0.92331 | 0.92124 | 0.92048 |
| Train60%_val | 0.82051 | 0.82056 | 0.82051 | 0.81508 |
| Train70%_val | 0.88095 | 0.88030 | 0.88095 | 0.87860 |
| Train80%_val | 0.91941 | 0.91879 | 0.91941 | 0.91872 |
| Train90%_val | 0.92307 | 0.92485 | 0.92307 | 0.92217 |
| Train100%_val | 0.90659 | 0.90885 | 0.90659 | 0.90574 |

Data related to user information and user images may be involved, and accordingly user permission or consent may be necessary, and collection, use, and processing of related data may have to comply with related laws, regulations, and standards of related countries and regions.

Figure 6:
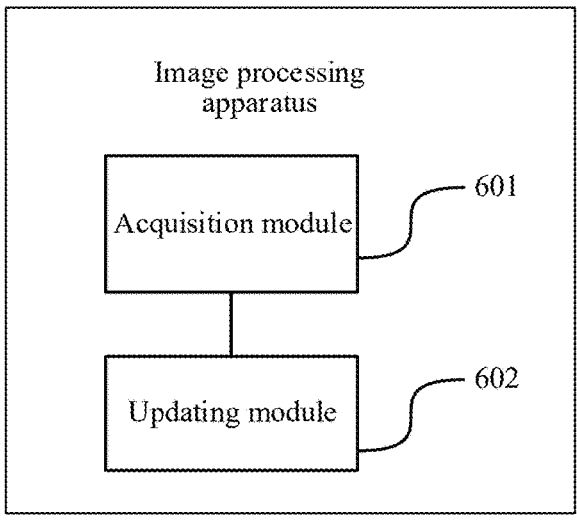
FIG. 6 is a schematic structural diagram of an example image processing apparatus according to an embodiment of this disclosure.

FIG. 6 is a schematic structural diagram of an image processing apparatus according to an embodiment of this disclosure. Referring to FIG. 6, the apparatus includes: an acquisition module 601, configured to: perform classification processing on at least two first images and at least two second images through an image classification model, to obtain predicted classification results of the at least two first images and the at least two second images, the first image carrying a corresponding classification label, the second image carrying a corresponding pseudo classification label, the first image and the second image being images including to-be-recognized objects, the predicted classification result, the classification label, and the pseudo classification label being used for indicating an attribute type of the to-be-recognized object; acquire a first loss value based on the predicted classification results and the corresponding classification labels of the at least two first images and the predicted classification results, and the corresponding pseudo classification labels of the at least two second images, the first loss value being used for indicating accuracy of the predicted classification result; and acquire a second loss value based on the predicted classification results and the corresponding pseudo classification labels of the at least two second images, the second loss value being used for indicating accuracy of the pseudo classification label; and an updating module 602, configured to: update a model parameter of the image classification model based on the first loss value and the second loss value; update the corresponding pseudo classification labels based on the predicted classification results of the at least two second images; and then continuously perform classification processing, and acquisition processing of first loss value and the second loss value until a target image classification model is obtained when a target condition is met.

In some embodiments, the acquisition module 601 is configured to: acquire errors between the predicted classification results and the corresponding pseudo classification labels of the at least two second images; and perform weighting on the errors corresponding to the at least two second images according to weights of the at least two second images, to obtain the second loss value.

In some embodiments, the acquisition module 601 is configured to: cluster the at least two first images and the at least two second images, to obtain a clustering result, the clustering result including at least two clustering centers and an image corresponding to each of the clustering centers; and acquire the weight of each of the second images according to a distance between each of the second images and the clustering center to which each of the second images belongs.

In some embodiments, the acquisition module 601 is configured to: acquire a probability corresponding to each of the second images according to the distance between each of the second images and the clustering center to which each of the second images belongs, the probability being a probability that the pseudo classification label is a correct classification label; and acquire the weights of the at least two second images based on the probabilities corresponding to the at least two second images.

In some embodiments, the acquisition module 601 is configured to: acquire the probability as the weight of the second image in response to the probability corresponding to any second image being greater than or equal to a probability threshold; and acquire a zero value as the weight of the second image in response to the probability corresponding to any second image being less than the probability threshold.

In some embodiments, the updating module 602 is configured to acquire the pseudo classification label corresponding to the predicted classification result of each of the second images according to the predicted classification results of the at least two second images and the clustering result.

In some embodiments, the acquisition module 601 is configured to: process the at least two second images, and the predicted classification results and the corresponding pseudo classification labels of the at least two second images based on a Gaussian mixture model, to obtain the second loss value. The updating module 602 is further configured to update a model parameter of the Gaussian mixture model based on the second loss value.

In some embodiments, the acquisition module 601 is further configured to: acquire predicted types of the at least two first images and the at least two second images according to the at least two first images, the at least two second images, and the corresponding predicted classification results, the predicted type indicating whether a particular image of the at least two first images and the at least two second images is the first image or the second image; acquire a third loss value according to the predicted types of the at least two first images and the at least two second images, the third loss value being used for indicating accuracy of the predicted type.

In some embodiments, the updating module 602 is configured to update the model parameter of the image classification model based on the first loss value, the second loss value, and the third loss value.

In some embodiments, the acquisition module 601 is configured to perform discriminative processing on the at least two first images, the at least two second images, and the corresponding predicted classification results based on a discriminative network, to obtain the predicted types of the at least two first images and the at least two second images. The updating module 602 is further configured to update a network parameter of the discriminative network according to the third loss value.

In some embodiments, the acquisition module 601 is further configured to acquire a third image in response to an image processing instruction, the third image being a medical image. The apparatus further includes: a classification module, configured to: input the third image into the target image classification model; perform feature extraction on the third image through the target image classification model; and classify the third image based on an extracted image feature, to obtain a type of a lesion in the third image.

According to the apparatus provided in this embodiment of this disclosure, the pseudo classification label is used for labeling the second image during training of the image classification model, and the corresponding loss value is designed based on the pseudo classification label, to indicate whether the pseudo classification label is accurate. The model parameter is updated based on the loss value, and the pseudo classification label is also updated during updating. In this case, only some images may correspond to classification labels. During model training, pseudo classification labels are generated for other images, that is, not all images correspond to classification labels, which can greatly reduce labor costs caused by manual labeling and therefore improve training efficiency. In addition, the pseudo classification label is continuously updated during model training, and finally a pseudo classification label with about the same accuracy as the classification label can be determined, to increase a quantity of training samples, thereby improving the accuracy of the image classification model.

When the image processing apparatus provided in the foregoing embodiment performs image processing based on AI, the division of the foregoing functional modules is merely used as an example for description. In actual application, the foregoing functions may be allocated to and completed by different functional modules based on various needs. For example, an internal structure of the server may be divided into different functional modules, to complete all or some of the functions described above. In addition, the image processing apparatus provided in the foregoing embodiment belongs to the same concept as the embodiment of the image processing method. For an example implementation process of the apparatus, reference may be made to the method embodiments described herein.

Figure 7:
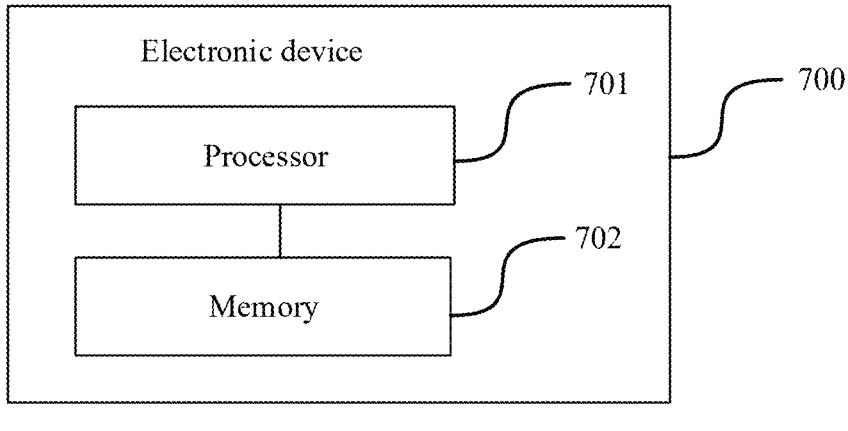
FIG. 7 is a schematic structural diagram of an example electronic device according to an embodiment of this disclosure.

FIG. 7 is a schematic structural diagram of an electronic device according to an embodiment of this disclosure. The electronic device 700 may vary due to different configurations or performance, and may include one or more central processing units (CPUs) 701 and one or more memories 702. The memory 702 stores at least one computer program, the at least one computer program being loaded and executed by the processor 701 to implement the image processing method provided in the foregoing method embodiments. The electronic device may further include other components to implement a device function, for example, the electronic device may further include components such as a wired or wireless network interface, and an input/output interface, for inputting and outputting.

Figure 8:
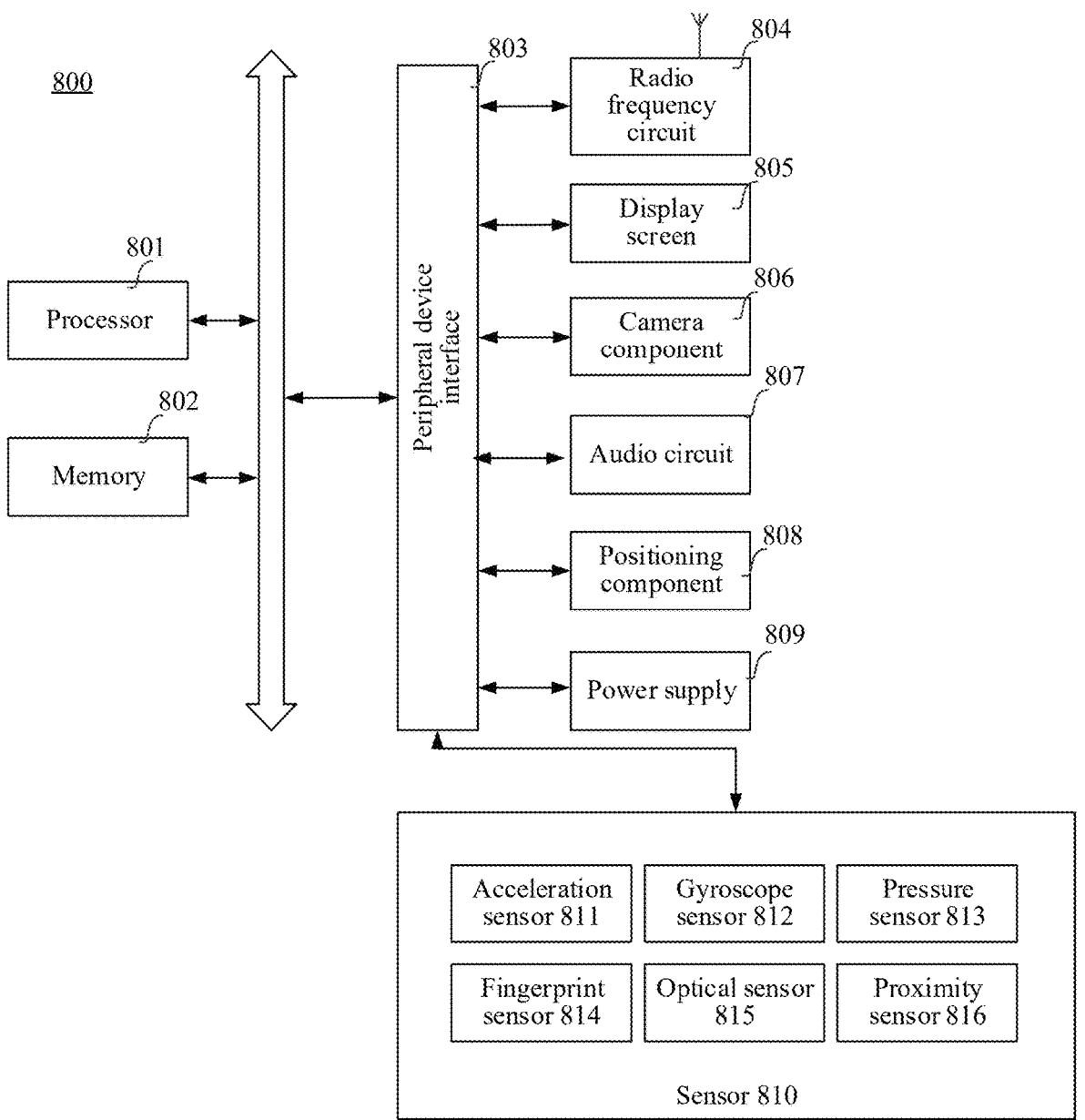
FIG. 8 is a structural block diagram of an example terminal according to an embodiment of this disclosure.

The electronic device in the foregoing method embodiments may be implemented as a terminal. For example, FIG. 8 is a structural block diagram of a terminal according to an embodiment of this disclosure. The terminal 800 may be a portable mobile terminal, such as a smartphone, a tablet computer, a notebook computer, a desktop computer, a smart speaker, a smartwatch, an audio playback device, a video playback device, a medical device. The terminal 800 may also be referred to as user equipment, a portable terminal, a laptop terminal, a desktop terminal, or by another name.

Generally, the terminal 800 includes: a processor 801 and a memory 802.

The processor 801 may include one or more processing cores. For example, the processor 801 may be a 4-core processor or an 8-core processor. The processor 801 may be implemented by using at least one hardware form of a digital signal processor (DSP), a field-programmable gate array (FPGA), and a programmable logic array (PLA). The processor 801 may also include a main processor and a coprocessor. The main processor is a processor configured to process data in an awake state, and is also referred to as a central processing unit. The coprocessor is a low-power processor configured to process data in a standby state. In some embodiments, the processor 801 may be integrated with a graphics processing unit (GPU), which is responsible for rendering and drawing content to be displayed on a display screen. In some embodiments, the processor 801 may further include an AI processor. The AI processor is configured to process computing operations related to machine learning.

The memory 802 may include one or more non-transitory computer-readable storage media. The non-transitory computer-readable storage medium may be non-transient. The memory 802 may further include a high-speed random access memory, and a non-volatile memory such as one or more magnetic disk storage devices or flash storage devices. In some embodiments, the non-transitory computer-readable storage medium in the memory 802 is configured to store at least one instruction, and the at least one instruction is configured to be executed by the processor 801 to implement the image processing method provided in the method embodiments of this disclosure.

In some embodiments, the terminal 800 may include a peripheral device interface 803 and at least one peripheral device. The processor 801, the memory 802, and the peripheral device interface 803 may be connected by a bus or a signal cable. Each peripheral device may be connected to the peripheral device interface 803 through a bus, a signal line, or a circuit board. The peripheral device includes: at least one of a radio frequency circuit 804, a display screen 805, a camera assembly 806, an audio frequency circuit 807, a positioning component 808, and a power supply 809.

The peripheral device interface 803 may be configured to connect at least one input/output (I/O)-related peripheral device to the processor 801 and the memory 802. In some embodiments, the processor 801, the memory 802, and the peripheral device interface 803 are integrated on the same chip or circuit board. In some other embodiments, any one or two of the processor 801, the memory 802, and the peripheral device interface 803 may be implemented on a single chip or circuit board.

The radio frequency circuit 804 is configured to receive and transmit a radio frequency (RF) signal, also referred to as an electromagnetic signal. The radio frequency circuit 804 communicates with a communication network and other communication devices through the electromagnetic signal. The radio frequency circuit 804 converts an electrical signal into an electromagnetic signal for transmission, or converts a received electromagnetic signal into an electrical signal. As an example, the RF circuit 804 includes: an antenna system, an RF transceiver, one or more amplifiers, a tuner, an oscillator, a digital signal processor, a codec chip set, a subscriber identity module card, and the like. The radio frequency circuit 804 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (WiFi) network. In some embodiments, the RF circuit 804 may further include a circuit related to near field communication (NFC), or other suitable communication.

The display screen 805 is configured to display a user interface (UI). The UI may include a graph, a text, an icon, a video, and any combination thereof. When the display screen 805 is a touch display screen, the display screen 805 is further capable of collecting touch signals on or above a surface of the display screen 805. The touch signal may be inputted, as a control signal, to the processor 801 for processing. In this case, the display screen 805 may be further configured to provide a virtual button and/or a virtual keyboard, which is also referred to as a soft button and/or a soft keyboard. In some embodiments, there may be one display screen 805 disposed on a front panel of the terminal 800. In some other embodiments, there may be at least two display screens 805 disposed on different surfaces of the terminal 800 or designed in a foldable shape. In some other embodiments, the display screen 805 may be a flexible display screen disposed on a curved surface or a folded surface of the terminal 800. Even, the display screen 805 may be further set to have a non-rectangular irregular shape, that is, a special-shaped screen. The display screen 805 may be made of materials such as a liquid crystal display (LCD), and an organic light-emitting diode (OLED).

The camera assembly 806 is configured to capture an image or a video. As an example, the camera assembly 806 includes a front-facing camera and a rear-facing camera. Generally, the front-facing camera is arranged on a front panel of the terminal, and the rear-facing camera is arranged on a rear surface of the terminal. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera assembly 806 may further include a flash. The flash may be a single color temperature flash or a double color temperature flash. The double color temperature flash refers to a combination of a warm light flash and a cold light flash, and may be used for light compensation under different color temperatures.

The audio frequency circuit 807 may include a microphone and a speaker. The microphone is configured to acquire sound waves of a user and an environment, and convert the sound waves into electrical signals and input the electrical signals into the processor 801 for processing, or input the electrical signals into the radio frequency circuit 804 to implement voice communication. For a purpose of stereo acquisition or noise reduction, there may be a plurality of microphones disposed at different portions of the terminal 800. The microphone may be alternatively a microphone array or an omnidirectional acquisition microphone. The speaker is configured to convert electric signals from the processor 801 or the radio frequency circuit 804 into sound waves. The speaker may be a conventional thin-film speaker or a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio circuit 807 may also include an earphone jack.

The positioning component 808 is configured to determine a current geographic location of the terminal 800 for implementing navigation or a location-based service (LBS). The positioning component 808 may be a positioning component based on the global positioning system (GPS) of the United States, the BeiDou System of China, and the Galileo System of Russia.

The power supply 809 is configured to supply power to components in the terminal 800. The power supply 809 may be an alternating-current power supply, a direct-current power supply, a disposable battery, or a rechargeable battery. When the power supply 809 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 800 may further include one or more sensors 810. The one or more sensors 810 include, but are not limited to: an acceleration sensor 811, a gyroscope sensor 812, a pressure sensor 813, a fingerprint sensor 814, an optical sensor 815, and a proximity sensor 816.

The acceleration sensor 811 may detect the magnitude of acceleration on three coordinate axes of a coordinate system established with the terminal 800. For example, the acceleration sensor 811 may be configured to detect the components of gravitational acceleration on three coordinate axes. The processor 801 may control, according to a gravity acceleration signal collected by the acceleration sensor 811, the display screen 805 to display the user interface in a frame view or a portrait view. The acceleration sensor 811 may also be configured to collect game or user motion data.

The gyroscope sensor 812 may detect a body direction and a rotation angle of the terminal 800, and the gyroscope sensor 812 may work with the acceleration sensor 811 to collect a 3D action performed by the user on the terminal 800. The processor 801 may implement the following functions according to the data collected by the gyroscope sensor 812: motion sensing (for example, changing the UI according to a tilt operation of the user), image stabilization during shooting, game control, and inertial navigation.

The pressure sensor 813 may be arranged on a side frame of the terminal 800 and/or a lower layer of the display screen 805. When the pressure sensor 813 is disposed at the side frame of the terminal 800, a holding signal of the user on the terminal 800 may be detected, and the processor 801 performs left/right hand recognition or a quick operation according to the holding signal collected by the pressure sensor 813. When the pressure sensor 813 is arranged on the lower layer of the display screen 805, the processor 801 controls an operable control on the UI interface according to a pressure operation of the user on the display screen 805. The operable control includes at least one of a button control, a scroll-bar control, an icon control, and a menu control.

The fingerprint sensor 814 is configured to collect a fingerprint of a user, and the processor 801 identifies the identity of the user according to the fingerprint collected by the fingerprint sensor 814, or the fingerprint sensor 814 identifies the identity of the user according to the collected fingerprint. When the identity of the user is identified as a trusted identity, the processor 801 authorizes the user to perform a related sensitive operation. The sensitive operation includes unlocking a screen, viewing encryption information, downloading software, payment, changing settings, and the like. The fingerprint sensor 814 may be disposed on a front surface, a back surface, or a side surface of the terminal 800. When a physical key or vendor logo is arranged on the terminal 800, the fingerprint sensor 814 may be integrated with the physical key or the vendor logo.

The optical sensor 815 is configured to collect ambient light intensity. In an embodiment, the processor 801 may control display luminance of the display screen 805 according to the ambient light intensity collected by the optical sensor 815. When the ambient light intensity is relatively high, the display luminance of the display screen 805 is increased. When the ambient light intensity is relatively low, the display luminance of the display screen 805 is reduced. In another embodiment, the processor 801 may further dynamically adjust a camera parameter of the camera component 806 according to the ambient light intensity collected by the optical sensor 815.

The proximity sensor 816, also referred to as a distance sensor, is usually disposed on a front panel of the terminal 800. The proximity sensor 816 is configured to collect a distance between a user and the front surface of the terminal 800. In an embodiment, when the proximity sensor 816 detects that the distance between the user and the front surface of the terminal 800 gradually becomes smaller, the display screen 805 is controlled by the processor 801 to switch from a screen-on state to a screen-off state. When the proximity sensor 816 detects that the distance between the user and the front surface of the terminal 800 gradually becomes larger, the display screen 805 is controlled by the processor 801 to switch from the screen-off state to the screen-on state.

The structure shown in FIG. 8 is merely an example and does not constitute a limitation on the terminal 800. The terminal may include more or fewer assemblies than those shown in the figure, a combination of some assemblies, or different assembly arrangements.

Figure 9:
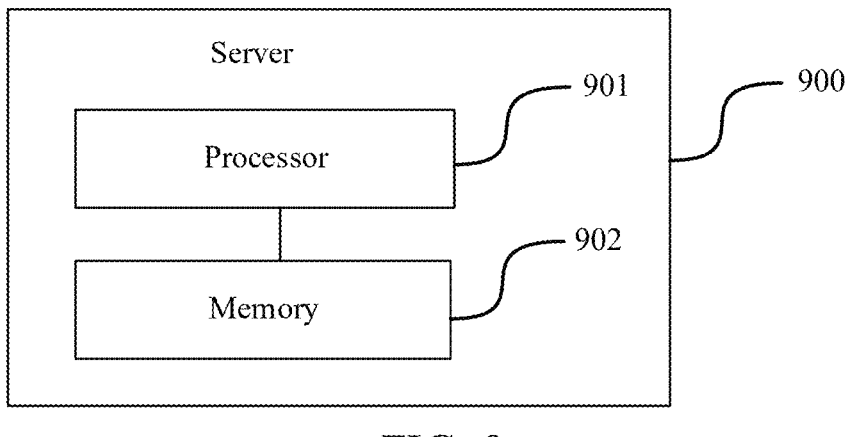
FIG. 9 is a schematic structural diagram of an example server according to an embodiment of this disclosure.

The electronic device in the foregoing method embodiments may be implemented as a server. For example, FIG. 9 is a schematic structural diagram of a server according to an embodiment of this disclosure. The server 900 may vary greatly due to different configurations or performance, and may include one or more processors 901 and one or more memories 902. The memory 902 stores at least one computer program, the at least one computer program being loaded and executed by the processor 901 to implement the image processing method provided in the foregoing method embodiments. The server may also have a wired or wireless network interface, an input/output interface and other components to facilitate input/output. The server may also include other components for implementing device functions.

In an example embodiment, a non-transitory computer-readable storage medium, for example, a memory including at least one computer program is further provided. The at least one computer program may be executed by a processor in a terminal to implement the image processing method in the foregoing embodiments. For example, the non-transitory computer-readable storage medium may be a read-only memory (ROM), a random access memory (RAM), a compact disc read-only memory (CD-ROM), a magnetic tape, a floppy disk, an optical data storage device, and the like.

In an example embodiment, a computer program product or a computer program is further provided, including one or more pieces of program code, the one or more pieces of program code being stored in a non-transitory computer-readable storage medium. One or more processors of an electronic device can read the one or more pieces of program code from the non-transitory computer-readable storage medium, and the one or more processors execute the one or more pieces of program code to enable the electronic device to perform the foregoing image processing method.

Sequence numbers of the foregoing processes do not require an execution sequences in various embodiments of this disclosure. The execution sequences of the processes should be determined according to functions and internal logic of the processes, and should not be construed as any limitation on the implementation processes of the embodiments of this disclosure.

Determining B according to A does not mean that B is determined only according to A, but also means that B may be determined according to A and/or other information.

The steps of the foregoing embodiments may be implemented by hardware, or may be implemented a program instructing related hardware. The program may be stored in a non-transitory computer-readable storage medium. The storage medium may be: a ROM, a magnetic disk, or an optical disc.

The foregoing descriptions are merely example embodiments of this disclosure, but are not intended to limit this disclosure. Any modification, equivalent replacement, or improvement made within the spirit and principle of this disclosure shall fall within the protection scope of this disclosure.

What is claimed is:

1. An image processing method comprising:
processing at least two first images and at least two second images using an image classification model to obtain predicted classification results of the at least two first images and the at least two second images, wherein the first images comprise classification labels and the second images comprise pseudo classification labels, and wherein the predicted classification results, the classification labels, and the pseudo classification labels indicate an attribute type;
acquiring a first loss value based on the predicted classification results and the classification labels of the at least two first images and the predicted classification results and the pseudo classification labels of the at least two second images, wherein the first loss value indicates an accuracy of the predicted classification results;
acquiring a second loss value based on the predicted classification results and the pseudo classification labels of the at least two second images by acquiring errors between the predicted classification results and the pseudo classification labels of the at least two second image, and weighting the errors based on weights of the at least two second images, wherein the second loss value indicates an accuracy of the pseudo classification labels, and wherein the weighting the errors comprises:
clustering the at least two first images and the at least two second images to obtain a clustering result, the clustering result comprising at least two clustering centers and images corresponding to each of the clustering centers; and;
acquiring the weight of each of the second images based on a distance between each of the second images and the corresponding clustering centers;
updating a model parameter of the image classification model based on the first loss value and the second loss value;
updating the pseudo classification labels based on the predicted classification results of the at least two second images; and
performing classification processing and acquisition of the first loss value and the second loss value until a target image classification model is obtained.

2. The method according to claim 1, wherein the acquiring the weight of each of the second images further comprises:
acquiring a label probability corresponding to each of the second images based on the distance between each of the second images and the corresponding clustering centers, the label probability being a probability that the pseudo classification label is a correct classification label; and
acquiring the weight of each of the second images based on the label probability corresponding to each of the second images.

3. The method according to claim 2, wherein the acquiring the weight of each of the second images further comprises:
defining the weight of the second image as being the label probability when the label probability corresponding to any of the second images is greater than or equal to a probability threshold; and
defining the weight of the second image as zero value when the label probability corresponding to any of the second images is less than the probability threshold.

4. The method according to claim 1, wherein the updating the pseudo classification labels further comprises:
acquiring the pseudo classification labels corresponding to the predicted classification results of each of the second images based on the predicted classification results of the at least two second images and the clustering result.

5. The method according to claim 1, wherein the acquiring the second loss value further comprises:
processing the predicted classification results and the pseudo classification labels of the at least two second images based on a Gaussian mixture model to obtain the second loss value; and
wherein the method further comprises:
updating a model parameter of the Gaussian mixture model based on the second loss value.

6. The method according to claim 1, the method further comprising:
acquiring predicted types of the at least two first images and the at least two second images based on the at least two first images, the at least two second images, and the predicted classification results; and acquiring a third loss value according to the predicted types of the at least two first images and the at least two second images, the third loss value indicating an accuracy of the predicted type; and wherein the updating the model parameter of the image classification model further comprises:

updating the model parameter based on the first loss value, the second loss value, and the third loss value.

7. The method according to claim 6, wherein the acquiring the predicted types of the at least two first images and the at least two second images further comprises:

processing, using a discriminative network, the at least two first images, the at least two second images, and the predicted classification results to obtain the predicted types of the at least two first images and the at least two second images; and wherein the method further comprises:

updating a network parameter of the discriminative network according to the third loss value.

8. The method according to claim 1, further comprising:

acquiring a third image in response to an instruction;

inputting the third image into the target image classification model;

performing feature extraction on the third image using the target image classification model; and classifying the third image based on an extracted image feature to obtain an attribute type of the third image.

9. The method according to claim 8, wherein the third image is a medical image.

10. The method according to claim 1, the method further comprising:

acquiring the at least two first images and the at least two second images, the second images comprising neither the classification labels nor the pseudo classification labels;

acquiring initial predicted classification results of the at least two first images and the at least two second images based on an initial model;

acquiring an initial first loss value based on the classification label and the initial predicted classification result of the first images;

updating an initial model parameter of the initial model based on the initial first loss value; and acquiring the pseudo classification labels corresponding to the at least two second images based on the initial predicted classification results of the at least two second images.

11. The method according to claim 1, wherein the performing classification processing and acquisition further comprises:

updating the pseudo classification labels based on the predicted classification results of the at least two second images;

performing classification processing on the at least two first images and the at least two second images using the image classification model obtained by updating the model parameter, to obtain updated predicted classification results;

re-updating the classification labels corresponding to the at least two first images based on the updated predicted classification results, the pseudo classification labels corresponding to the at least two second images, and the model parameter of the image classification model, wherein the updating the pseudo classification labels, the performing classification processing, and the re-updating the classification labels are performed until a target condition is met; and defining, when the target condition is met, the target image classification model as the image classification model obtained by updating the model parameter.

12. An image processing device comprising at least one processor and at least one memory, the at least one memory storing computer-readable instructions, the computer-readable instructions, when executed by the at least one processor, causing the at least one processor to:

process at least two first images and at least two second images using an image classification model to obtain predicted classification results of the at least two first images and the at least two second images, wherein the first images comprise classification labels and the second images comprise pseudo classification labels, and wherein the predicted classification results, the classification labels, and the pseudo classification labels indicate an attribute type;

acquire a first loss value based on the predicted classification results and the classification labels of the at least two first images and the predicted classification results and the pseudo classification labels of the at least two second images, wherein the first loss value indicates an accuracy of the predicted classification result; and acquire a second loss value based on the predicted classification results and the pseudo classification labels of the at least two second images by acquiring errors between the predicted classification results and the pseudo classification labels of the at least two second images, and weighting the errors based on weights of the at least two second images, and wherein the second loss value indicates an accuracy of the pseudo classification labels, and wherein the weighting of the errors comprises:

clustering the at least two first images and the at least two second images to obtain a clustering result, the clustering result comprising at least two clustering centers and images corresponding to each of the clustering centers; and acquiring the weight of each of the second images based on a distance between each of the second images and the corresponding clustering centers;

update a model parameter of the image classification model based on the first loss value and the second loss value;

update the pseudo classification labels based on the predicted classification results of the at least two second images; and perform classification processing and acquisition of the first loss value and the second loss value until a target image classification model is obtained.

13. A non-transitory computer-readable storage medium storing at least one instruction, at least one program, a code set, or an instruction set, the at least one instruction, the at least one program, the code set, or the instruction set being loaded and executed by at least one processor, causing the at least one processor to perform an image processing method comprising:

processing at least two first images and at least two second images using an image classification model to obtain predicted classification results of the at least two first images and the at least two second images, wherein the first images comprise classification labels and the second images comprise pseudo classification labels, and wherein the predicted classification results, the classification labels, and the pseudo classification labels indicate an attribute type;

acquiring a first loss value based on the predicted classification results and the classification labels of the at least two first images and the predicted classification results and the pseudo classification labels of the at least two second images, wherein the first loss value indicates an accuracy of the predicted classification results;

acquiring a second loss value based on the predicted classification results and the pseudo classification labels of the at least two second images by acquiring errors between the predicted classification results and the pseudo classification labels of the at least two second image, and weighting the errors based on weights of the at least two second images, wherein the second loss value indicates an accuracy of the pseudo classification labels, and wherein the weighting the errors comprises:

acquiring the weight of each of the second images based on a distance between each of the second images and the corresponding clustering centers;

updating a model parameter of the image classification model based on the first loss value and the second loss value;

updating the pseudo classification labels based on the predicted classification results of the at least two second images; and performing classification processing and acquisition of the first loss value and the second loss value until a target image classification model is obtained.

14. The non-transitory computer-readable storage medium according to claim 13, the method further comprising:

acquiring a third image in response to an instruction;

inputting the third image into the target image classification model;

performing feature extraction on the third image using the target image classification model; and classifying the third image based on an extracted image feature to obtain an attribute type of the third image.

15. The non-transitory computer-readable storage medium according to claim 14, wherein the third image is a medical image.

16. The non-transitory computer-readable storage medium according to claim 13, wherein the acquiring the weight of each of the second images further comprises:

acquiring a label probability corresponding to each of the second images based on the distance between each of the second images and the corresponding clustering centers, the label probability being a probability that the pseudo classification label is a correct classification label; and acquiring the weight of each of the second images based on the label probability corresponding to each of the second images.

17. The non-transitory computer-readable storage medium according to claim 13, wherein the updating the pseudo classification labels further comprises:

acquiring the pseudo classification labels corresponding to the predicted classification results of each of the second images based on the predicted classification results of the at least two second images and the clustering result.

18. The non-transitory computer-readable storage medium according to claim 13, wherein the acquiring the second loss value further comprises:

processing the predicted classification results and the pseudo classification labels of the at least two second images based on a Gaussian mixture model to obtain the second loss value; and wherein the method further comprises:

updating a model parameter of the Gaussian mixture model based on the second loss value.

19. The non-transitory computer-readable storage medium according to claim 13, the method further comprising:

acquiring predicted types of the at least two first images and the at least two second images based on the at least two first images, the at least two second images, and the predicted classification results; and acquiring a third loss value according to the predicted types of the at least two first images and the at least two second images, the third loss value indicating an accuracy of the predicted type; and wherein the updating the model parameter of the image classification model further comprises:

updating the model parameter based on the first loss value, the second loss value, and the third loss value.

20. The non-transitory computer-readable storage medium according to claim 13, the method further comprising:

acquiring the at least two first images and the at least two second images, the second images comprising neither the classification labels nor the pseudo classification labels;

acquiring initial predicted classification results of the at least two first images and the at least two second images based on an initial model;

acquiring an initial first loss value based on the classification label and the initial predicted classification result of the first images;

updating an initial model parameter of the initial model based on the initial first loss value; and acquiring the pseudo classification labels corresponding to the at least two second images based on the initial predicted classification results of the at least two second images.

* * * * *